Oct. 25, 1938.    C. W. SHARTLE, JR    2,134,490
SELF-OILING CHAIN SPROCKET
Filed Nov. 9, 1936    2 Sheets-Sheet 1

Inventor
CHARLES W. SHARTLE, JR.
Jesse R. Stone
Lester B. Clark
By
Attorneys

Oct. 25, 1938.   C. W. SHARTLE, JR   2,134,490
SELF-OILING CHAIN SPROCKET
Filed Nov. 9, 1936   2 Sheets-Sheet 2

Inventor
CHARLES W. SHARTLE, JR.
By Jesse R. Stone
Lester B. Clark
Attorneys

Patented Oct. 25, 1938

2,134,490

UNITED STATES PATENT OFFICE 2,134,490

SELF-OILING CHAIN SPROCKET

Charles W. Shartle, Jr., Houston, Tex.

Application November 9, 1936, Serial No. 109,830

3 Claims. (Cl. 74—243)

The invention relates to an improvement in sprocket wheels and their associated parts where the sprocket is used in combination with a chain drive so that lubricant may be furnished to the chain to avoid undue wear and noise.

In connection with certain mechanisms, sprocket and chain constructions are used to transmit power, and this is particularly true in connection with the drilling equipment for wells where power is transmitted from an engine through a draw works or hoist and then to the various mechanisms such as the rotary table. With equipment of this sort where mud and slush containing abrasive materials are used during the drilling operation, naturally the chains and sprockets are subjected to excessive wear, and in view of the high speed of the sprockets and chains considerable difficulty has been encountered in maintaining proper lubrication for the chains and sprockets. Other situations embodying the same general difficulties are obviously encountered in other lines of industry.

It is one of the objects of the present invention to provide a mechanism whereby a lubricant can be readily disposed so that it will flow gradually to the chain in order to maintain lubrication thereof for a considerable period of time.

Another object of the invention is to provide a sprocket with oil pockets and discharge passages so that lubricant may flow to the chain passing about the sprocket.

Another object of the invention is to adapt existing sprocket wheels by a simple and economical alteration so that they can be converted into lubricating sprocket wheels.

Another object of the invention is to provide flanges for existing sprockets so as to convert them for use in providing lubricant for the chains.

Still another object of the invention is to apply walls to the flanges of a sprocket wheel in order to provide a lubricant reservoir.

Other and further objects of the invention will be readily apparent when the following description is considered in connection with the accompanying drawings wherein.

Figure 7:
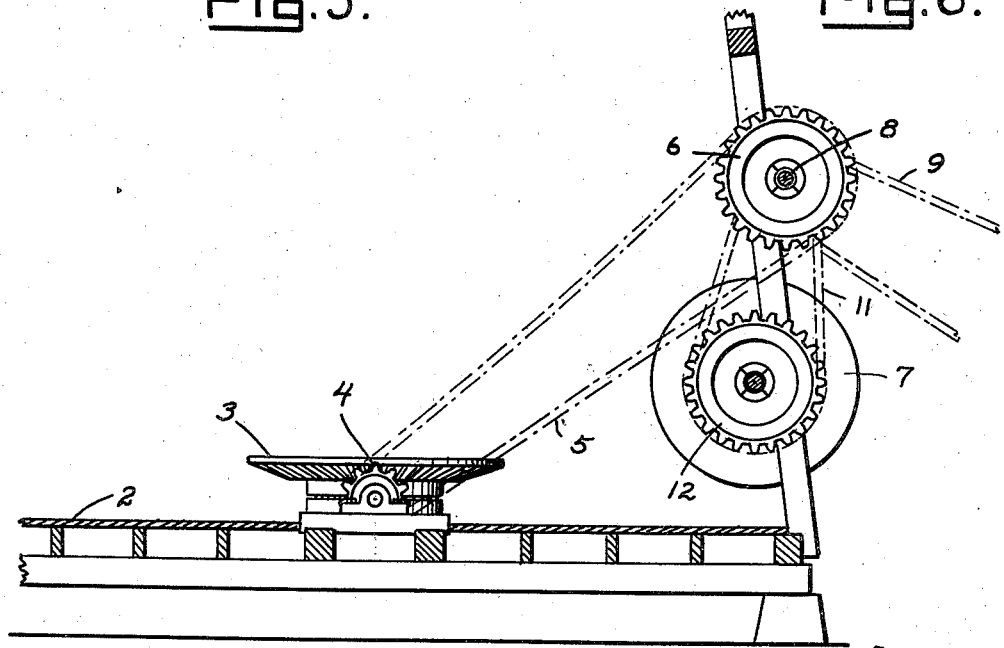
Figure 7 shows a general view of the draw works and rotary table to illustrate how the chain and sprockets are employed in a well drilling rig.

In the drilling of wells the Figure 7 shows the general construction wherein the floor of the derrick is illustrated at 2 and has the rotary table 3 mounted thereon. This table is driven by the pinion or sprocket 4 by means of a chain 5 which extends from the driven sprocket 6 of the draw works or hoisting mechanism 7.

The shaft 8 which carries the sprocket 6 is driven from a suitable source of supply by a chain 9 and additional sprockets on the shaft 8 drive the chain 11 which passes over the hoist or drum sprocket 12. Various speeds may be imparted to the rotary table 3 by shifting the sprockets on the line shaft 8, but the entire general arrangement shows that a number of chains and sprockets are employed in the driving mechanism.

It will be understood that during the drilling operation the drill pipe passes vertically through the rotary table 3 and that mud and slush are circulated downwardly through this drill pipe and upwardly through the well. As the drill pipe is connected and disconnected the mud and slush flow over the rotary table and are spread about the derrick so that the chains 5, 9, and 11, and the sprockets 4, 6 and 12 are frequently bathed in mud containing sand and other abrasive materials. The rotary table turns at speeds of from 1 to 200 revolutions per minute, so that it will be observed that it is very difficult to lubricate the sprockets and chains.

Figure 2:
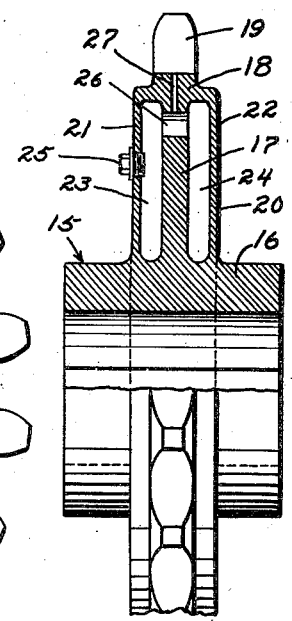
Figure 2 is a partial sectional view transversely of Figure 1.

Any one of the sprockets of Figure 7 may be illustrated by the general type of sprocket shown in either Figures 2, 4, 5 or 6. In Figure 2 a sprocket wheel 15 has been illustrated as being made up of a hub 16, a web 17, a flange 18, and the teeth 19. In order, however, to provide lubricant adjacent the toothed periphery of the sprocket, an additional housing 20 has been provided around the web 17. This housing is made up of the walls 21 and 22, which respectively form reservoirs 23 and 24 with the web 17. These reservoirs can be annular so that they extend entirely around the hub 16 and an opening to introduce lubricant is closed by the plug 25.

Figure 1:
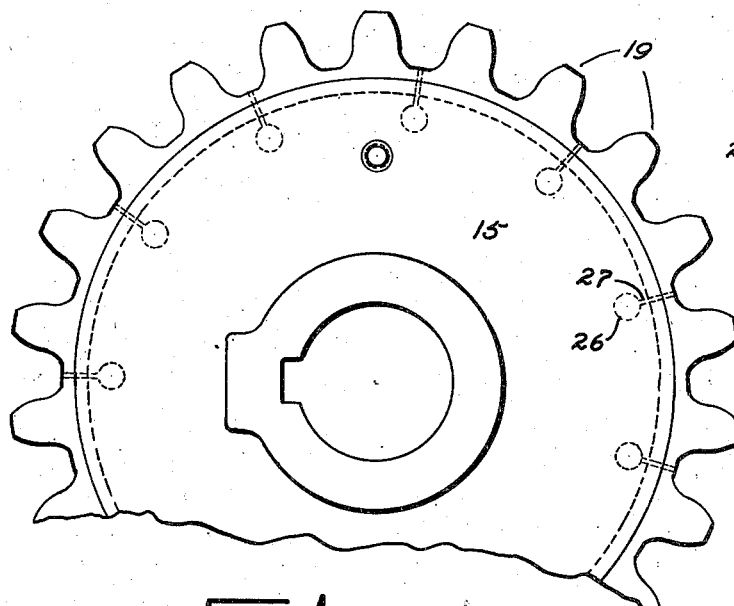
Figure 1 is a side view of a sprocket wheel constructed to embody the lubricating features of the invention.

In order that the lubricant may flow to the chain as it passes over the teeth 19, an opening 26 has been provided in the web 17 adjacent the area between any two of the teeth 19 on the periphery. A passage 27 then leads outwardly through the flange 18 into the recess between two adjacent teeth. As seen in Figure 1, a number of the recesses 26 and passages 27 have been provided, it not being deemed necessary that such a passage be provided between successive teeth because usually the chain passes over different teeth on the sprocket on each trip.

It seems obvious from the foregoing that lubricant may be deposited in the reservoirs 23 and 24, and in view of the restricted end of the passages 27 the lubricant will flow gradually into the area between the teeth so as to lubricate the chain. Obviously the centrifugal force of the rotating sprocket will assist in discharging the lubricant.

Figure 3:
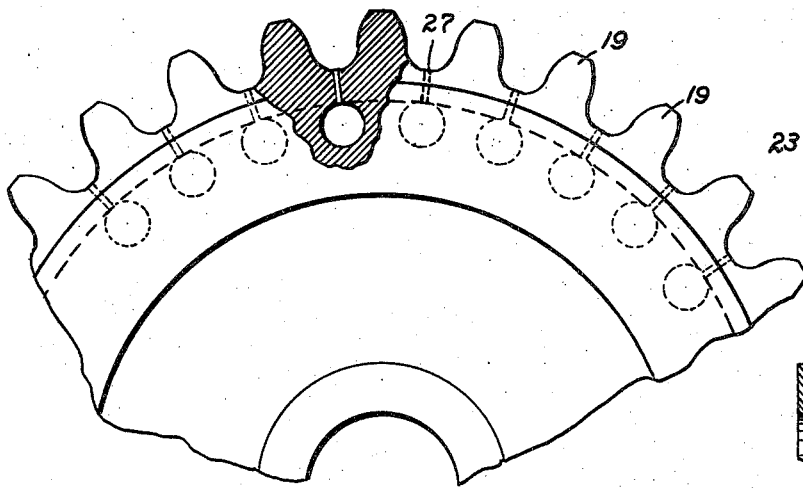
Figure 3 shows another form of sprocket wherein the lubricating feature has been incorporated.
Figure 4:
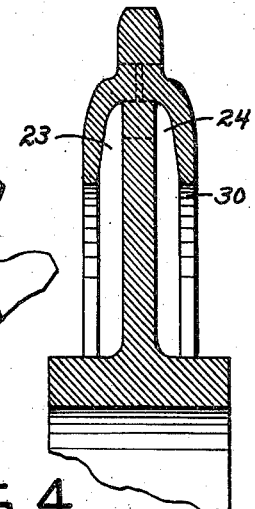
Figure 4 is a broken sectional view of Figure 3.

Figures 3 and 4 show a slightly modified form which embodies the same structure as that previously described in connection with Figures 1 and 2, except that the walls 21 and 22 are cut away at 30 to leave openings so that the reservoirs 23 and 24 are not completely closed. In this manner lubricant may be added to the sprocket while it is rotating and will be held in the reservoirs 23 and 24 due to centrifugal force. Figure 3 is modified with respect to Figure 1 in that it shows a passage 27 as entering into each of the spaces between the adjacent teeth 19.

Figures 5, 6:
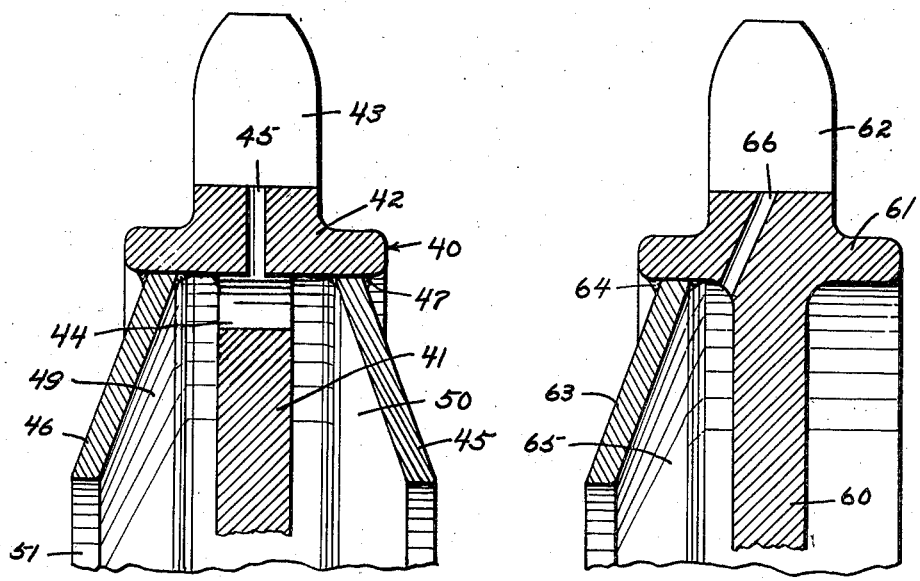
Figure 5 shows a broken sectional view of a sprocket which originally did not embody the lubricating features but which has been altered to include the lubricating passages and lubricant reservoir.
Figure 6 shows another form of sprocket wherein a solid web of the sprocket has been employed with an added flange to form a lubricant reservoir.

Figure 5 shows a form of the invention wherein a sprocket 40 of ordinary and usual construction has been modified somewhat in order to adapt it so that the present invention may be incorporated therein. This sprocket originally embodied a spoke such as 41, the flange 42 and the teeth 43. The spoke 41 has been drilled to provide a recess 44 and the passage 45 has been drilled inwardly from the periphery of the sprocket until it opens into the recess 41. Inside of the flange 42 the walls 45 and 46 have been positioned and are in the form of annular rings of sheet metal which are affixed to the inside of the flange by means of the welding material 47. These flanges may be flared as indicated in Figure 5, or they may be otherwise arranged so long as they provide a reservoir space 49 and 50 on each side of the sprocket wheel.

Like the type of Figure 4, Figure 5 shows a sprocket which when converted permits the lubricant to be added while the sprocket is rotating by merely introducing the lubricant into the reservoirs 49 and 50 over the edge 51 of the walls 45 and 46.

Figure 6 shows a form in which an existing sprocket has been converted where the sprocket originally embodied a solid web 60 in order to support the flange 61 on the teeth 62. In this form of the invention a single wall 63 has been added and is held in position by the welding material 64, so as to provide a single reservoir 65, it being understood that the web 60 of the sprocket forms the other wall of the reservoir in order that the lubricant may move upwardly between the teeth 62. The discharge passage 66 has been drilled through the flange 61 so as to lead or open into the reservoir 65.

While several forms of the invention have been shown and described, it is intended that the invention contemplates broadly the idea of providing a simple and economical construction whereby lubricant may be passed through the periphery of the sprocket to a chain passing over the sprocket and wherein the lubricant may be contained in a reservoir or added periodically as desired.

What is claimed is:

1. A toothed wheel comprising a hub, a web on said hub, a rim mounted on said web and having teeth on the periphery thereof and inwardly extending walls attached to the rim on opposite sides of said web to form a reservoir said web being provided with transverse openings adjacent said rim and said rim having passages extending from said openings to spaces between certain of the teeth.

2. A toothed wheel, comprising a rim having teeth on the periphery thereof, a hub, a web integrally uniting said hub and said rim, radially extending walls secured to said hub and rim but in spaced relation with said web to provide closed chambers, said web being provided with transverse openings to provide communication between chambers thus formed and said rim being provided with passages from the openings to the teeth.

3. A toothed wheel, comprising a rim having teeth on the periphery thereof, a hub, a web integrally uniting said hub and said rim, radially extending walls secured to said hub and rim but in spaced relation with said web to provide closed chambers, said web being provided with transverse openings to provide communication between chambers thus formed and said rim being provided with passages from openings to spaces between certain of the teeth.

CHARLES W. SHARTLE, Jr.